INVENTOR.
ARTHUR A. SWANSON
BY
HIS ATTORNEY

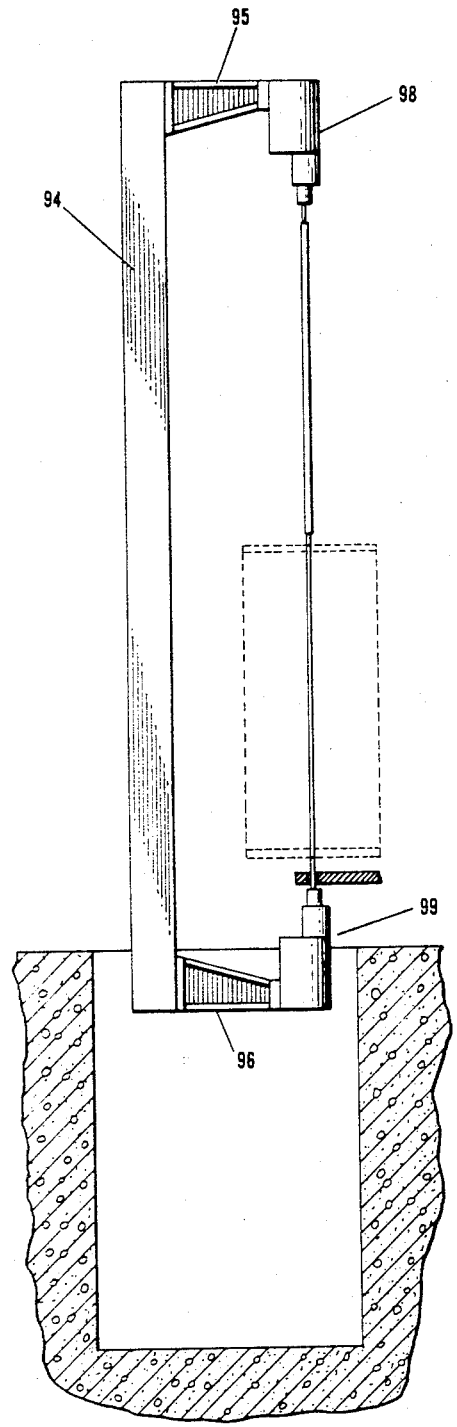
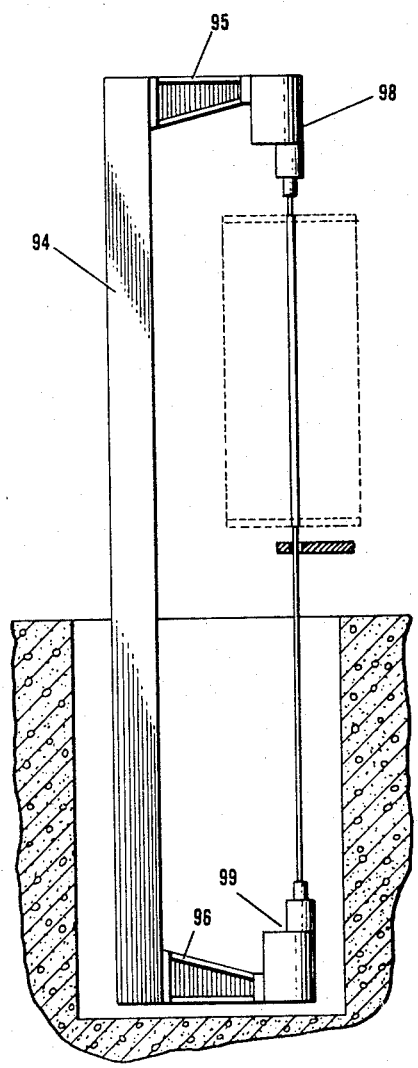
FIG. 4
FIG. 5

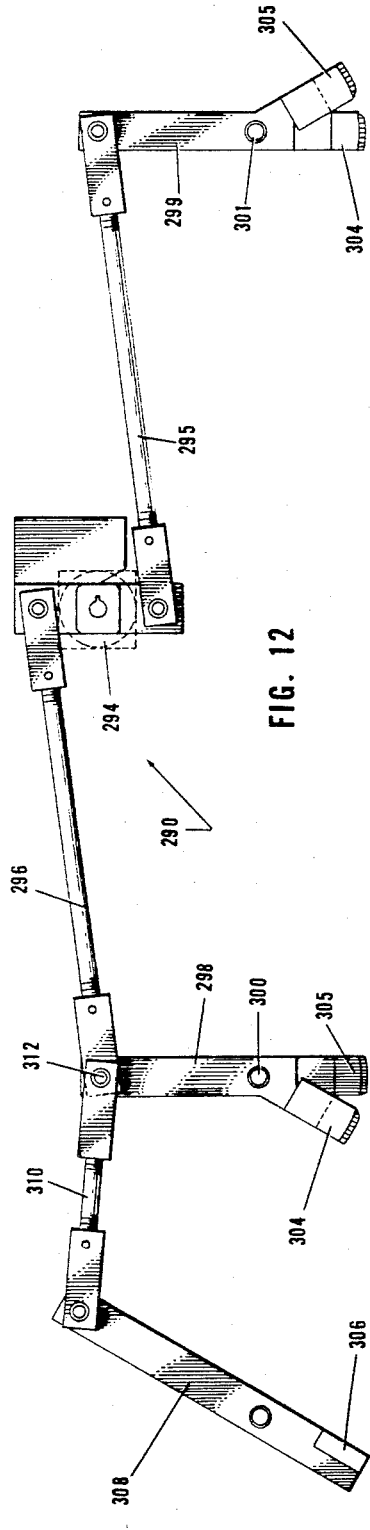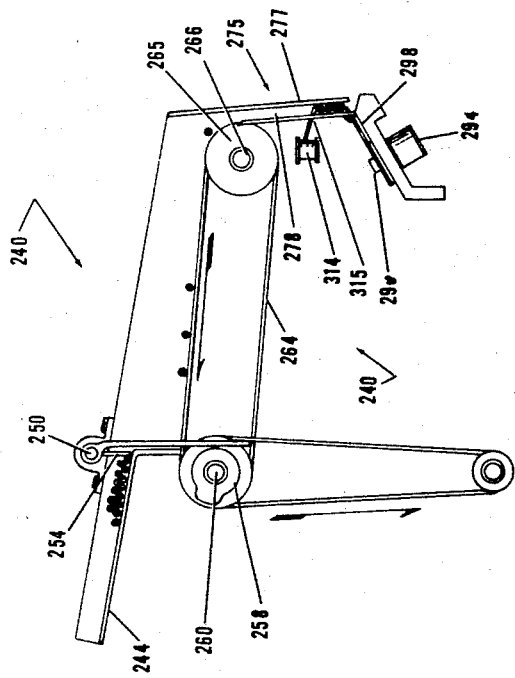

United States Patent Office 3,421,199
Patented Jan. 14, 1969

3,421,199
APPARATUS AND METHOD FOR MANUFACTURING TUBE ASSEMBLIES FOR HEAT EXCHANGE DEVICES
Arthur A. Swanson, Erie, Pa., assignor to General Electric Company, a corporation of New York
Filed Sept. 30, 1966, Ser. No. 583,238
U.S. Cl. 29—157.3                                    26 Claims
Int. Cl. B21d 53/02; B23p 15/26; B21k 29/00

This invention relates to a new and improved apparatus for making tube assemblies for heat exchange devices of the type sometimes referred to as a shell-and-tube heat exchangers or liquid coolers.

Heat exchange devices of the shell-and-tube type include a plurality, often thousands, of tubes of uniform length having their opposite ends secured to end plates, termed tube sheets. Between these end plates there is provided a number of baffle plates which serve the dual purpose of defining an extended path of flow for the fluid medium, as well as maintaining the tubes in uniformly spaced relationship. In view of the foregoing, it is evident that each of the end plates and the baffle plates must be provided with a plurality of suitable holes in a preselected pattern and then the tubes inserted through the holes in these spaced-apart plates after which the ends of the tubes are suitably secured, usually by a roller-expanding tool, into each of the end plates. Heretofore the manufacture of heat exchange devices of this type has been primarily a manual operation wherein the end plates and baffle plates are suitably assembled and then the tubes inserted in the holes in the plates and thereafter roller expanded at each end into the respective end plate. This procedure has been both difficult and time consuming in that the holes are often not in precise alignment which makes tube insertion troublesome. Also, one end of the tube must usually be held while roller expanding the other end thereof into its tube sheet which further contributes to the difficulty of manufacture. At times this operation requires two operators, although on short heat exchange devices one operator can sometimes accomplish the roller expansion and holding functions alone, but not without some difficulty. The time and difficulty in assembling the tubes into the end plates and baffle plates and securing them into their respective end plates has contributed greatly to the expense of manufacturing such devices.

It is an object of this invention, therefore, to provide a new and improved apparatus for manufacturing tube assemblies for shell-and-tube type heat exchange devices which substantially overcomes one or more of the foregoing difficulties.

It is another object of this invention to provide a new and improved apparatus for manufacturing tube assemblies for heat exchange devices including automatic positioning and installation of the tubes into the holes in a stacked and suitably spaced-apart array of tube sheets and baffle plates.

A further object of this invention is to provide a tube transfer arrangement for positioning a tube from a supply to a precise location for installation through the holes of a plurality of vertically spaced-apart tube sheets and baffle plates.

A still further object is to provide a magazine for holding a supply of heat exchange tubes in a horizontal position including means associated therewith for providing horizontal alignment of the tubes, selection of one of the aligned tubes and transfer of the selected tube from a horizontal position at a tube supply station to a vertical position at a work station adjacent to and horizontally spaced therefrom.

A still further object of this invention is to provide a new and improved apparatus for positioning work pieces with respect to tools (or vice versa) at a plurality of different locations, positioning heat exchange tubes from a supply magazine to a selected location with respect to such tools and over a work piece made up of an aligned assembly of vertically spaced-apart plates having holes in a predetermined pattern therein and arranged to provide the tube sheets and baffle plates of a heat exchange device, installing the tube through a given hole in each of such aligned spaced-apart plates and securing, as by roller expanding, the ends of the tube into the tube sheets.

To accomplish these and other objects there is provided, in accordance with one aspect of this invention, apparatus including horizontally spaced-apart first, second and third work stations and a tube supply and transfer station. The first work station is arranged with the second work station on one side thereof and the third work station on the other side and with the tube supply and transfer station adjacent to the second work station.

The first work station is arranged to provide for the drilling (and thereafter reaming) of a plurality of holes in a predetermined pattern in a stacked plurality of plates sufficient in number and dimensions to provide for the end plates and required intermediate baffle plates for at least a complete heat exchanger tube assembly. Means are provided at the tube supply and transfer station for selecting one of a plurality of horizontally aligned tubes from a tube magazine for delivery to a tube transfer member. Means are provided for actuating the transfer member to cause transfer of the tube delivered thereto from its horizontal position at the tube magazine to a vertical position a predetermined distance above a work piece supporting table of the second work station. To assure proper location of the transferred tube with respect to the work piece and tools at the second work station, the work piece supporting table of both the first and second work stations are interconnected so that movement in both the X and Y directions imparted to the table at the first work station is transferred to the table at the second work station.

The second work station includes a C-frame member arranged for guided vertical movement between maximum upper and lower positions. A first tool assembly is mounted for limited independent vertical movement from the upper end of the C-frame member and a second tool assembly is similarly mounted for limited vertical movement from the lower end thereof. Associated with the first and second tool assemblies are first and second tool driving means for rotatably driving first and second tool means of said first and second tool assemblies, respectively. The first and second tool assemblies are thus arranged to be moved vertically up and down (i.e. toward and away from each other) to a limited extent and the tool means thereof separately rotated.

Means are provided for driving the C-frame member between its maximum upper and lower positions. Drive linkage means are also provided interconnecting the tube transfer member and the C-frame member so that the movement of the C-frame member is operative to cause movement of the transfer arm means. Specifically, downward movement of the C-frame member from its upper position causes the transfer arm member to move from a position where the tube holding means thereof is in a vertical position above the table of the second work station toward a position where such tube holding means is in a horizontal position at the tube supply and transfer station, and vice versa.

The second work station also includes means arranged to cause the second tool driving means to be energized to rotate the second tool means during both the upward and downward directions of movement of the C-frame member. Means are further provided for blocking the second tool driving means to prevent rotation thereof when the C-frame member is at its maximum upper and lower positions. Means are still further provided for causing the first tool driving means to be energized to rotate the first tool means through a torque-transmitting coupling means of preselected torque limit when the C-frame member is at its maximum downward position.

A third tool means is mounted for vertical movement from a tool support arm interconnected to the work piece supporting table of the first work station so that the tool support arm is caused to have the same movement in the X and Y directions as that of the table of the first work station. The third tool means is provided with a third tool driving means coupled thereto for rotatably driving the tool and means operative to cause vertical movement of the third tool means and energization of the tool driving means.

As used throughout the specification and the claims, movement in the direction parallel with the front of the apparatus will be termed X-movement or X-motion and movement from front-to-rear of the apparatus will be termed Y-movement or Y-motion.

The novel features believed characteristic of the invention are set forth with particularity in the appended claims. The invention itself both as to its organization and method of operation, together with further objects and advantages thereof, may best be understood by reference to the following description taken in connection with the accompanying drawing, in which:

FIGURES 4 and 5 are schematic representations of the relationship of the C-frame member, the tool assemblies associated therewith and the maximum upper and lower positions of such C-frame member;

FIGURE 9 is a front view of the tube supply and transfer station showing the tube transfer member in the position it assumes with the C-frame member of the second work station in its lower position;

FIGURE 11 is a diagrammatic representation of the tube aligning means of the tube supply and transfer station; and, FIGURE 12 is a top view of the escapement mechanism located at the bottom of the tube magazine of the tube aligning means shown in FIGURE 11.

GENERAL

Figure 1:
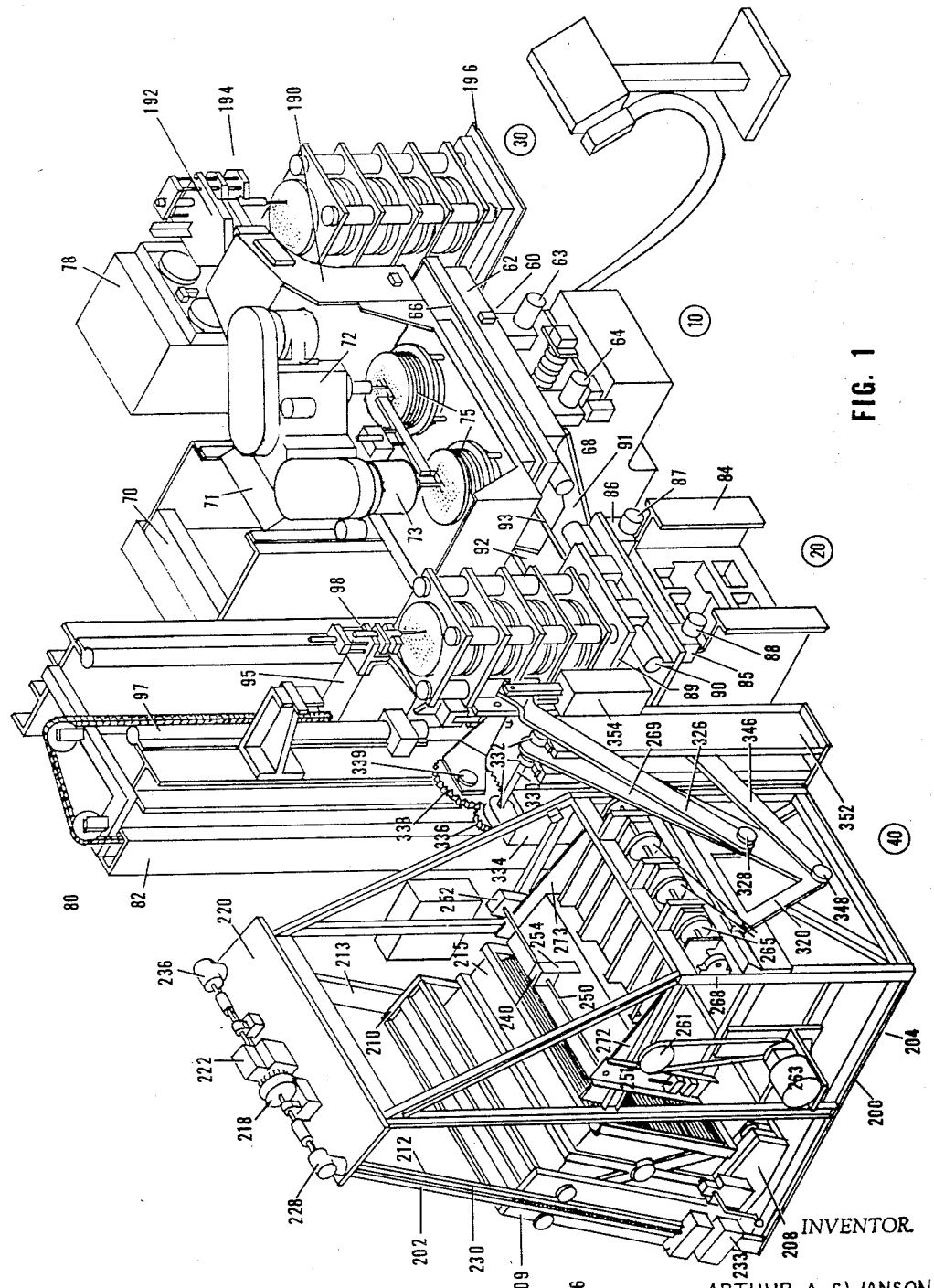
FIGURE 1 is a perspective view diagrammatically illustrating a heat exchange tube assembly manufacturing machine in accordance with one embodiment of this invention.
Figure 2:
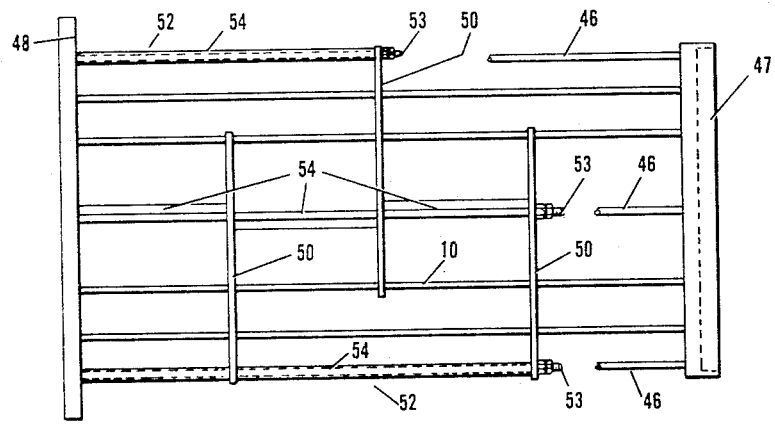
FIGURE 2 is a diagrammatic representation of a tube assembly of a heat exchanger of the tube-and-shell type capable of being manufactured by the machine of this invention.

FIGURE 1 is a perspective view of an overall apparatus in accordance with one embodiment of this invention for making tube assemblies for heat exchangers of the tube-and-shell type, one example of which tube assembly is shown schematically in FIGURE 2. As shown in FIGURE 1, the apparatus includes a first work station 10, a second work station 20, and a third work station 30 and a tube supply and transfer station 40. The second work station 20 is horizontally spaced from and on one side of the first work station, the third work station 30 horizontally spaced from and on the other side of the first work station 10 and the tube supply and transfer station 40 horizontally spaced from and on the other side of the second work station 20. The work stations 10, 20 and 30 and the tube supply and transfer station 40 are arranged and organized to provide for:

(1) Drilling and reaming a plurality of holes in a predetermined pattern in a stacked plurality of plates which provide the end plates and baffle plates for at least one complete tube assembly at the first work station 10;

(2) Selecting and delivering one of a plurality of horizontally aligned tubes from a tube magazine to the tube holding means of a tube transfer member at the tube supply and transfer station 40;

(3) Transfer of the tube so selected and held from a horizontal position at the station 40 to a vertical position at a pre-selected location at the second work station 20;

(4) Insertion of such vertically oriented tube from top to bottom through a given hole in a stacked array of spcaed-apart and suitably aligned and fixtures end plates and baffle plates;

(5) Securing, as by roller expanding, one end of the installed tube into its end plate at the second work station 20 and the opposite end thereof (of a different assembly) into its end plate at the third work station 30.

The foregoing functions 2 through 5 are provided during one cycle of operation when holes are being drilled at the first work station 10 as well as during the following cycle when the holes so drilled are being reamed at that first work station. From the foregoing, it will be understood that once the work stations have all been provided with their work piece a completed tube assembly will be provided for each cycle of operation of the apparatus. That is, a completed tube assembly is provided for the cycle of operation during which the plurality of holes are being drilled, as well as, during the cycle of operation during which such holes are being reamed. This is possible since each time a hole is being drilled at the first work station 10, a tube is being selected, delivered and transferred from station 40 to the second work station 20 and installed in the hole of a stacked assembly of plates which corresponds to that same location as the hole being drilled (or reamed) and then secured into the end plate. At the same time the opposite end of the tube in the hole at that same location is secured into its respective tube sheet at the third work station 30. This is achieved by providing as the workpiece for the third work station 30 a partially completed tube assembly obtained from a prior cycle of operation at the second work station 20.

For example, as shown more clearly in the schematic representation of FIGURE 2, a tube assembly of the type with which the present invention is related includes a plurality of tubes 46, only a few of which are shown, having their opposite ends secured to end plates or tube sheets 47 and 48. Intermediate the end plates 47 and 48 are a series of baffle plates 50 which are mounted on the tubes 46 and held in a preselected spaced-apart relationship by suitable spacer means, designated generally at 52 and including a bolt 53 and sleeve 54 therefor. The baffle plates 50 serve the dual purpose of defining an extended path of flow for the fluid medium, as well as, serving to maintain the tubes 46 in uniformly spaced relationship.

It will be understood that the tube assembly per se is not part of the present invention which is directed to a new apparatus for making tube assemblies of the type generally described, the specific structural details of which may, however, vary widely. In all such tube assemblies, however, a plurality of tubes must be assembled into the holes in a spaced-apart, stacked array of end plates and baffle plates and the ends of such tube suitably secured, usually roller expanded, into the end plates.

Preferably, in order to obtain the full advantages of the apparatus, the holes in the end plates 47 and 48 and in the baffle plates 50 should be provided in a pattern which is symmetrical about both center lines of the plates. Thus, the pattern of the holes should be such that those on one side of such center lines are the "mirror-image" of those on the other side thereof. This symmetrical or mirror-image arrangement of holes will be more readily understood from reference to FIGURE 3 which shows end plate 47 and a partial layout of the pattern of holes therein. The mirror-image pattern of holes allows a partially completed tube assembly from the second work station 20 to be inverted (end-for-end) and employed as the work piece for the third work station 30 and the same indexing which is provided to index the work piece with respect to the tools at work stations 10 and 20 also indexes the tool with respect to the work piece at third work station 30 even though such work piece is an inversion of the work piece from second work station 20.

FIRST WORK STATION

Referring again to FIGURE 1, the first work station 10 includes a work piece supporting and indexing table, referred to generally hereinafter as index table 60. Index table 60 includes a lower portion 62 mounted for movement in the Y direction, that is, forward and backward, on horizontally spaced apart guide rods 63 and 64. Movement in the X direction is allowed for by the provision of an upper portion 66 mounted for movement on spaced-apart guide rods, one of which is shown at 68, extending parallel with the front of the apparatus; the other guide rod being laterally spaced therefrom but not shown in FIGURE 1.

The first work station also includes a vertical frame member 70 to which is suitably mounted a drill head assembly 71 including power driven drill heads 72 and 73. Drill heads 72 and 73 extend forwardly from vertical frame member 70 so as to be arranged over and above index table 60.

Index table 60 is arranged to have suitable work pieces mounted thereon so that such work pieces will be properly presented to the drill heads in accordance with the indexing of index table 60. For example, as shown schematically, a stacked plurality of plates, indicated generally as 75, may be suitaly mounted on index table 60 so that drill heads 72 and 73 are adapted to perform the desired operation on such plates depending upon the particular tool installed in the drill heads. That is, either a drilling or a reaming operation is provided by appropriate selection and installation of drilling or reaming tools, respectively, in the drill heads 72 and 73.

Work station 10, as will be apparent from the foregoing description, may be provided by any conventional drill machine provided with a suitable index table to allow for the positioning thereof in both the X and the Y directions. In one particular apparatus for making tube assemblies for heat exchangers, the drill machine was a Pratt and Whitney Tape-O-Matic drill machine controlled by a punched tape operating through an appropriate Pratt and Whitney tape control, indicated generally at 78. The program provided for the apparatus is conveniently arranged so that during one cycle of operation a plurality of holes are drilled in the stacks of plates 75 by each of the drill heads 72 and 73 during one cycle of operation while during the following cycle of operation, these previously drilled holes are arranged to be reamed to a preselected size.

The plates 75 are conveniently selected in number to assure a sufficient number of plates being drilled by each of the drill heads 72 and 73 to provide for the later assembly of two complete tube assemblies. For example, each stack of plates 75 would include end plates 47 and 48 together with an appropriate number of baffle plates 50 to provide for the construction of a tube assembly such as that shown in FIGURE 2.

Since tape-controlled drill machines and their method of operation are well-known and understood in the art, it is not deemed necessary herein to further describe the detail or operation of such machine.

SECOND WORK STATION

*(FIGURES 1, 4 & 8)*

The second work station 20 includes a frame assembly 80 having a vertical rear section 82 and a lower forwardly extending base section 84. The forwardly extending base section 84 has mounted thereon a work supporting and indexing table, referred to generally as index table 85. Index table 85 is similar to index table 60 of first work station 10 and includes a lower portion 86 suitably mounted for movement in the Y direction on the horizontally spaced guide rods 87 and 88. Index table 85 also includes an upper portion 89 suitably mounted for movement in the X direction on laterally spaced apart guide rods extending parallel with the front of the apparatus, one of which is shown at 90. To assure that index table 85 will be oriented in the same X and Y coordinates as that of index table 60 at the first work station, the lower portion 86 of index table 85 is suitably interconnected to the lower portion 62 of index table 60 by a member 91 and the upper portion 89 of index table 85 is connected to the upper portion 66 of index table 60 by laterally spaced rods 92 and 93.

Mounted for vertical movement in the rear section 82 is a C-frame member 94 having a forwardly extending upper arm 95 and a similar forwardly extending lower arm 96. C-frame member 94 is mounted on horizontally spaced apart vertical guide rods 97 for movement from a maximum upward position indicated schematically in FIGURE 4 to a maximum downward position as indicated schematically in FIGURE 5. A first tool assembly 98 is mounted from the upper arm 95 for limited vertical movement with respect thereto and a second tool assembly 99 is similarly mounted from the lower extending arm 96 for limited vertical movement with respect thereto. The first tool assembly 98 is shown in more detail in FIGURES 6 and 7 and the second tool assembly 99 is shown in more detail in FIGURE 8.

Figure 6:
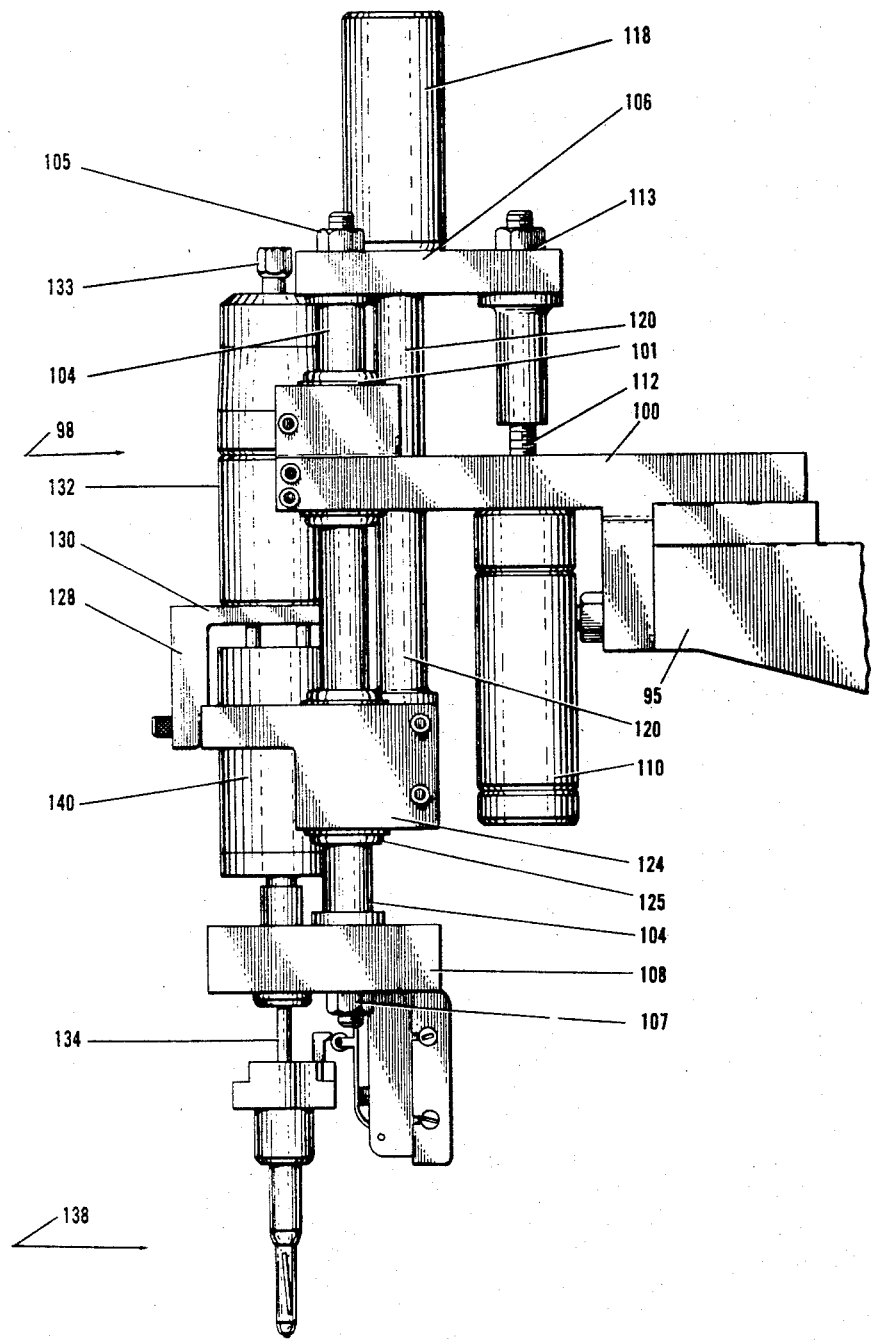
FIGURE 6 is a side view showing the details of the first (upper) tool assembly.
Figure 7:
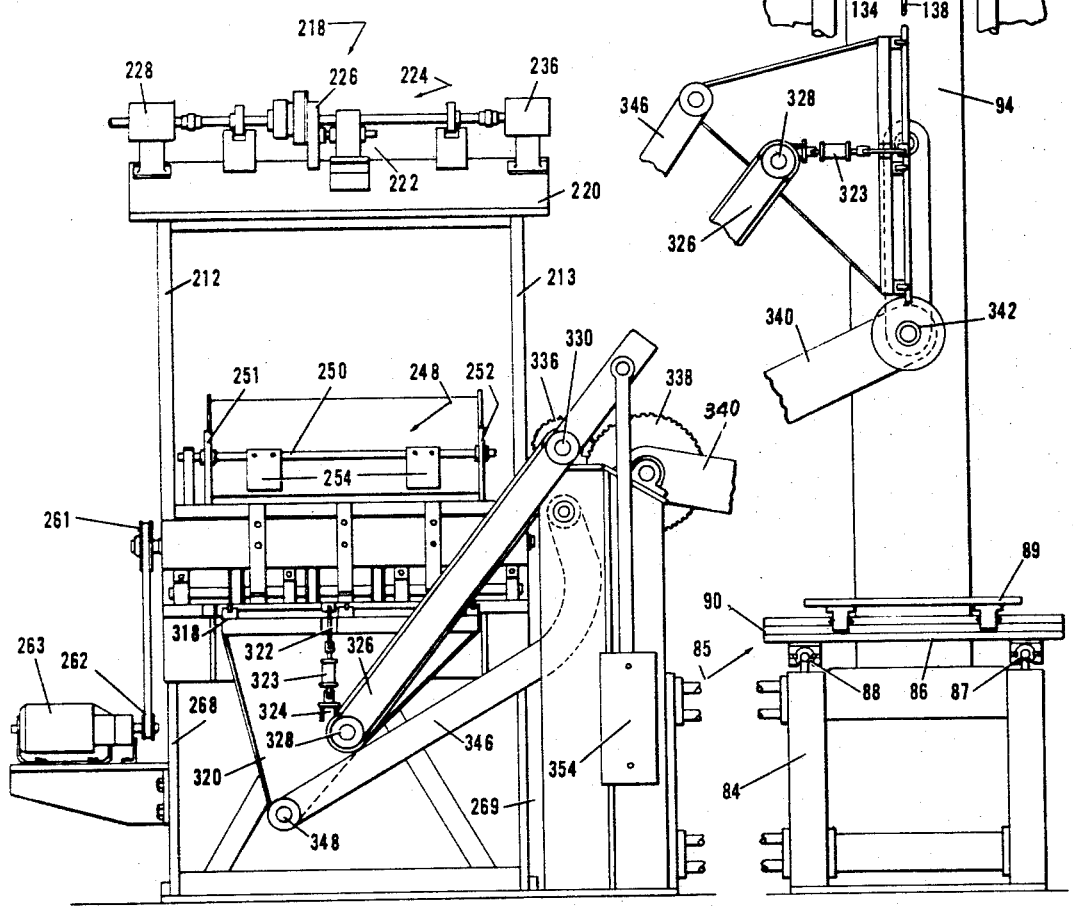
FIGURE 7 is a front view showing a part of the second work station and C-frame member thereof as well as the relationship of the first tool assembly to the tube transfer member when the C-frame member is in its upper position.

Referring now more particularly to FIGURES 6 and 7 first tool assembly 98 includes a tool assembly support member 100 which is suitably secured at one end to the extending upper arm 95 of C-frame member 94. The other end of member 100 terminates in a bifurcated portion having a pair of linear bearings 101 mounted therein to allow for movement therethrough of a pair of horizontally spaced-apart rods 104. Guide rods 104 are secured at one end, as by the nuts 105, to an upper support member 106 and at the other end in a lower support member 108.

Secured to the underside of tool assembly support member 100 is the body of a first air cylinder 110, the piston-rod 112 of which is connected for limited vertical movement to the upper support member 106. More specifically, piston-rod 112 passes through an opening in member 100 and is secured, as by the nut 113, to the upper support member 106. The body of a second air cylinder 118 is secured to the topside of member 106 and the piston-rod 120 thereof extends through such member and is secured to a sliding block 124. Sliding block 124 is provided with a pair of linear bearings 125 to allow for free movement thereof on the guide rods 104 in response to the movement of the piston-rod 120 of the second air cylinder 118.

Mounted from the front end of sliding block 124 is a bracket 128 which provides a supporting base 130 for a suitable tool driving means 132, which may be a reversible air motor of conventional type. The air supply line for the air motor may be suitably connected to the fitting 133 thereof.

The output shaft of the air motor is coupled to the mandrel 134 of a suitably tube expanding tool 138 through a suitable torque-limiting clutch means 140. Tube expanding tool 138 may be of any conventional type but is preferably of the parallel expanding, self-feeding, tapered mandrel type to allow for self-feeding of the mandrel into the tube during the expanding operation. The torque limiting clutch means 140 provides for a convenient way of obtaining control of the expansion of the tube to assure a good seal between the tube and the end plate to which it is to be secured.

Figure 8:
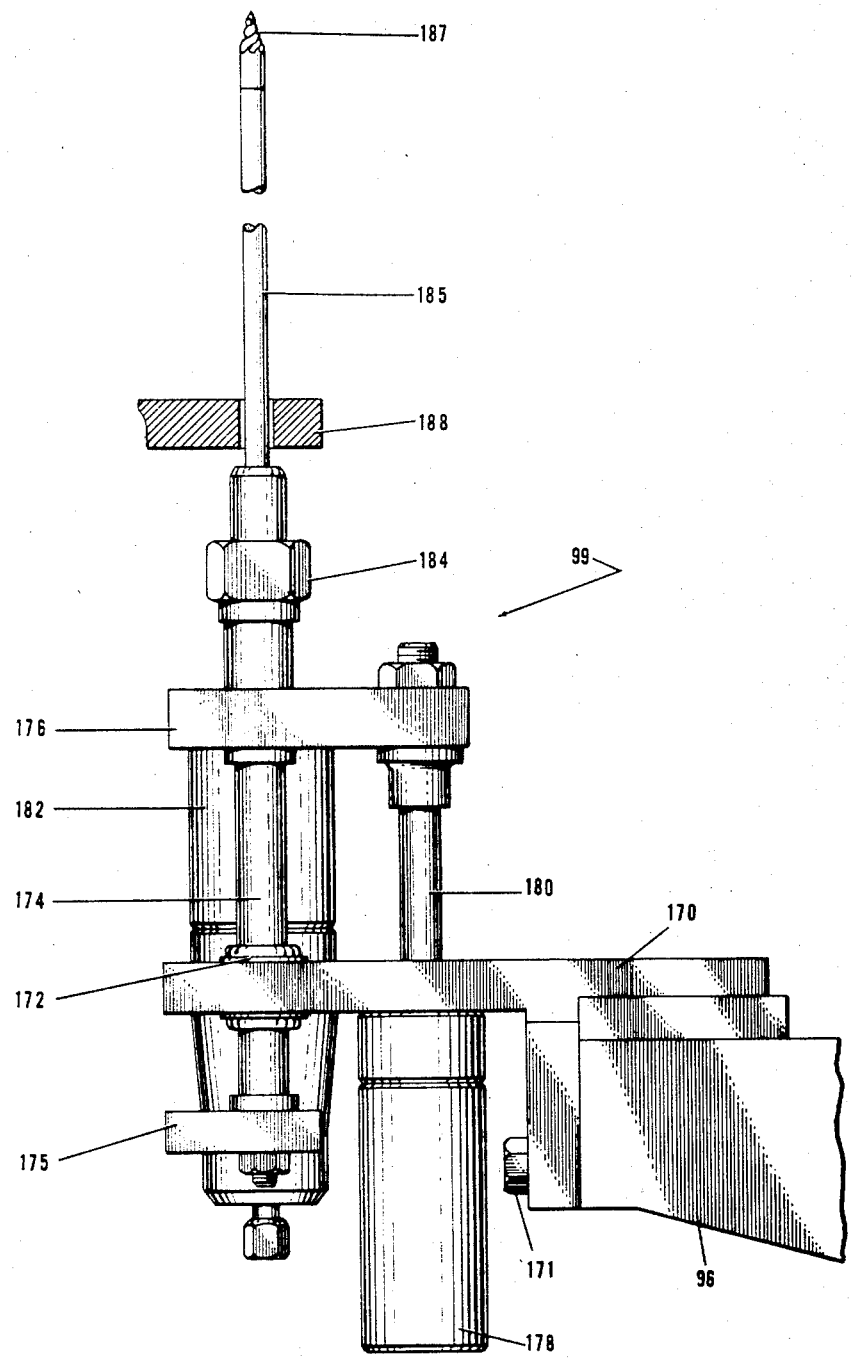
FIGURE 8 is a side view showing the details of the second tool assembly.

As shown particularly in FIGURE 8, the mounting arrangement for second tool assembly 99 is generally similar to that of first tool assembly 98. Accordingly, tool assembly 99 includes a tool assembly support member 170 which is suitably secured at one end, as by the bolt 171, to the extending lower arm 96 of C-frame member 94. The other end of member 170 terminates in a bifurcated portion having a pair of linear bearings 172 mounted therein to allow for movement therethrough of a pair of guide rods 174 secured at one end to a lower support member 175 and at the other end to an upper support member 176. An air cylinder 178 has its body secured to the underside of tool assembly support member 170. The piston arm 180 of air cylinder 178 passes through an opening in member 170 and is secured to upper support member 176. A reversible air motor 182 is mounted to member 176. The output shaft of motor 182 passes through member 176 and is attached to a suitable collet means 184 adapted to receive a suitable holding and driving tool 185 having a suitable tip 187 thereon adapted to fit into the end of a tube adapted to be positioned above tool assembly 99. A bracket 188 provides a suitable guide means for holding and driving tool 185.

Motor means 182 is arranged to be energized during both the upward and the downward movement of the C-frame member and to have its rotation prevented when the C-frame is at its maximum upper and lower positions. Thus, holding and driving tool means serves as a rotating guide rod which leads the tube adapted to be disposed between it and the first tool means through the holes in the vertically stacked, spaced-apart array of end plates and baffle plates. Also, since motor means 182 is prevented from rotating at the upper and lower positions of the C-frame member the tool means 185 also serves to hold the tube so that the "first end" roller expansion operation can be carried out by the first tool means. The tip 187, therefore, is arranged to fit within the end of the tube and provide for this holding and driving function. Tip 187 is illustrated as having a "reverse thread" such as that used in bolt and drill extractors although any other suitably tip configuration for holding the end of the tube will also be satisfactory.

THIRD WORK STATION

(FIGURE 1)

Extending from the upper section 66 of index table 60 is a tool supporting arm having a vertically extending portion 190 terminating in a horizontally extending portion 192. A tool assembly 194 is mounted for limited vertical movement with respect to the horizontally extending portion 192. As shown tool assembly 194 is so mounted that it extends over and above a work supporting platform 196 of the third work station 30. Tool assembly 194 is essentially the same as that shown in detail in FIGURE 6 except that the mandrel of the tube expanding tool means is driven directly by the air motor without an interposed torque-limiting clutch means 140. Also, at this third work station 30 the tube expansion tool means is preferably of the progressive, retractable type. The provision of the parallel type expansion tool at the second work station and the progressive type at this third work station provides a convenient means of assuring that the tubes of the assembly will be essentially stress-free. Since the tool supporting arm is integrally associated with index table 60, it will be apparent that this arm and the tool assembly mounted thereon will also be indexed in the X and Y directions in exactly the same manner as both the index table 60 at first work station 10 and the index table 100 at second work station 20. Since the work piece at this station is an inverted work piece from second work station the third tool means 194 actually operates at a complementary X, Y location.

TUBE SUPPLY AND TRANSFER STATION

(FIGURES 1 and 9–12)

The tube supply and transfer station 40 is arranged on the other side (the left as shown in FIGURE 1) of the second work station 20 and is horizontally spaced therefrom. As shown, tube supply and transfer station 40 includes a base member 200 and a frame assembly extending vertically therefrom providing a rear section 202 and a front section 204. Arranged in the rear section 202 is an elevator, designated generally at 206, and including a base or platform 208 and vertically extending side members 209 and 210. Rear vertically extending members 212 and 213 associated with the rear section 202 are inclined forward with respect to the vertical so that the platform 208 mounted therebetween also tips slightly forward. Platform 208 is provided with suitable rollers 214 so that a tube supply box 215 can be more readily positioned therein and aligned thereon from front to rear by means of aligning pins (not shown) arranged for movement, by a suitable crank means 216, into and out of holes provided in the sides of the supply box 215. Conveniently, the aligning pins may be provided with suitably tapering tips so that with the box nominally located from front-to-rear may be moved accurately aligned by movement of the pins into full engagement with the holes in the sides of the box. The pins provide the dual function of completing the alignment and holding the box at its aligned position.

To provide for selectively raising and lowering platform 208 of elevator 206, a drive mechanism indicated generally at 218 is mounted on a platform 220 secured near the top of vertically extending members 212 and 213. Drive mechanism 218 includes a suitable motor means 222, which may be a rotary actuator of the type sold under the name Rotac by the Excello Corporation. Motor means 222 is coupled to a drive shaft arrangement, generally designated at 224, through a suitable clutch means 226. One portion of drive shaft arrangement 224 is coupled through an angle gear 228 to a threaded rod 230 extending along the outside of vertically extending member 212. One end of rod 230 is journaled in a bearing means 232 and the other end thereof is journaled in a bearing means 233. Rod 230 is fitted within an internally threaded block 234 which is secured to the vertical member 209 and arranged for sliding movement along the vertically extending member 212. The other portion of drive shaft arrangement 224 is coupled through an angle gear 236 to a similarly disposed and journaled threaded rod extending along vertically extending member 213.

A tube storage and aligning means, generally designated at 240, is arranged in the front section 204 of tube supply and transfer station 40. Tube storage and aligning means 240 provides for the controlled delivery of tubes from tube supply box 215 in the rear section 202 to a tube magazine at the front section 204.

Figure 10:
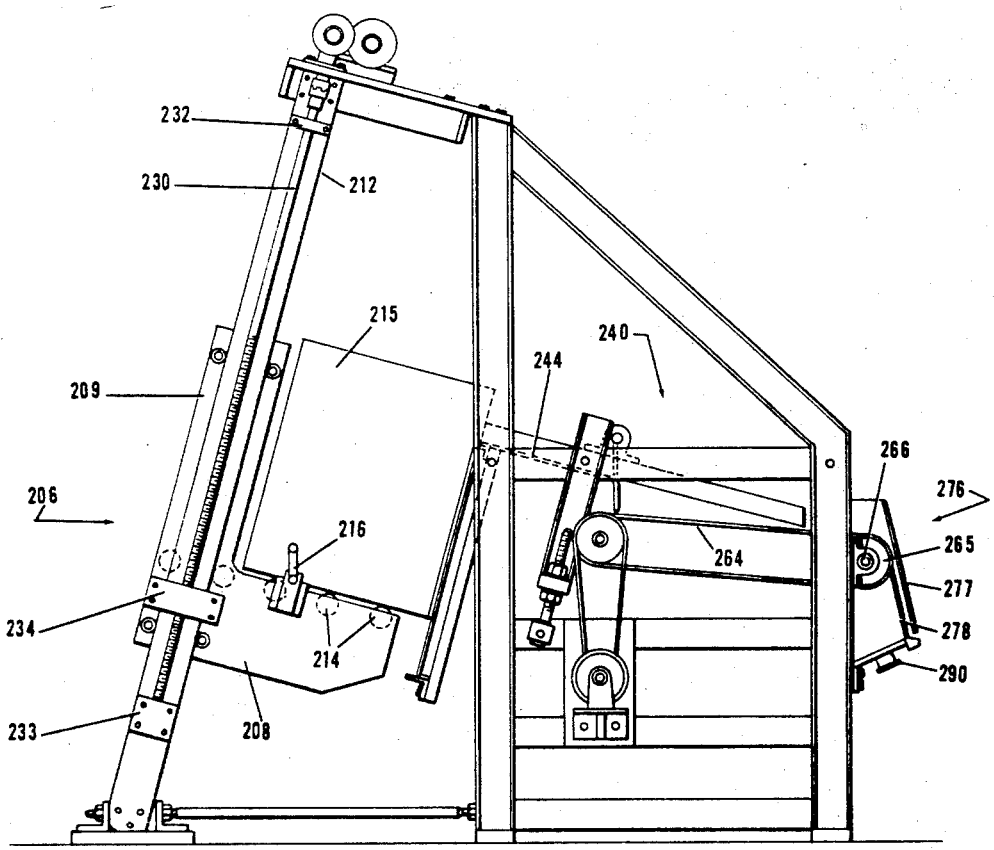
FIGURE 10 is a side view of the tube supply and transfer station of FIGURE 9.

As shown most clearly in FIGURES 10 and 11, tube storage and aligning means 240 includes a chute 244 which communicates at its rear with the front of elevator 206 (and the open front portion of the tube supply box mounted therein) and at its front above a plurality of spaced apart belts which provide for general horizontal alignment of tubes delivered thereon from a gate means 248 at the front of the chute 244. Chute 244 is arranged to be inclined slightly forward so that tubes delivered thereto from the tube supply box 215 will roll forward. Gate means 248 includes an actuating shaft 250 journaled in side plates 251 and 252 at opposite ends thereof. Secured to the actuating shaft 250 are depending blades 254 which in first or "closed" operative position retain the tubes on chute 244 behind the blades and in their other or "open" position allow some of the subes to pass between the tips thereof and the top surface of chute 244. One end of actuating shaft 250 has a cam follower arm 256 connected thereto, the end of which is positioned to ride on the surface of a cam 258 which is mounted on a drive shaft 260. Drive shaft 260 is driven by a suitable belt connected between a pulley 261 thereon and a pulley 262 on a suitable motor means 263.

Also connected to drive shaft 260, are a plurality of horizontally spaced-pulleys (not illustrated) which are connected by a plurality of belts 264 to pulleys 265 similarly mounted on a shaft 266 journaled in bearing blocks mounted on the vertical members 268 and 269 at the front of the machine. Drive shaft 260 is arranged to be vertically higher than shaft 266 so that when drive shaft 260 is driven in the direction indicated in FIGURE 11 the belts run "up-hill." The top surface of the belts thus cause tubes which are delivered thereto from chute 244 out of horizontal alignment to be carried "up-hill" and caused to be squared-off by the vertical side walls 272 and 273, after which the tubes roll down the inclined belts, each tube about its own axis, toward the front end of the apparatus. In one specific apparatus, for example, the shafts 260 and 266 were arranged so that the belts were inclined from rear to front at an angle of about 3° with respect to the horizontal.

A tube magazine 276, having a front wall means 277 and a rear wall means 278 provided at the opposite ends thereof is arranged just in front of the pulleys 265 to receive the horizontally aligned tubes as they drop after rolling down the inclined belts 264. Associated with the bottom of tube magazine 276 is an escapement means 290, shown in more detail in FIGURE 12.

The escapement means 299 is arranged to be oscillated horizontally by a suitable motor means 294 which is connected through linkage arms 295 and 296 to horizontally spaced-apart forwardly extending escapement arms 298 and 299 which are pivotally mounted at 300 and 301, respectively. As the escapement arms 298 and 299 are actuated for a cycle of movement horizontally back and forth at the required time during the operating cycle, the escapement fingers 304 and 305 thereof effect the release of only a single tube from the bottom of tube magazine 275. At the same time the end 306 of arm 308 which is connected to arm 296 through link 310 and pivotally mounted at 312, strikes the ends of the tubes in the lower portion of magazine 275 driving them against the side of vertical member 269 at the opposite end to further assure the horizontal alignment of the tubes prior to the release of a tube from the tube magazine 275.

As shown in FIGURE 11, a switch 314 is located adjacent the rear of tube magazine 275. Switch 314 has a switch arm 315 which is biased upwardly by a suitable spring means (not shown) and has its end extending into tube magazine 275. Switch arm 315 is arranged to be held down by tubes above it within the tube magazine and when in this downward position motor means 263 is deenergized and gate means 248 is in its non-operating condition with blades 254 in the closed position. Also, shaft 260 is stationary so that neither cam 258 nor the pulleys driving belts 264 are rotating. As tubes are released from the bottom of tube magazine 275 a point is reached where no more tubes remain above switch arm 315 and the arm moves to its upward position causing motor means 263 to be energized to cause rotation of driveshaft 260 to activate the gate means 248 by operation of follower arm 256 on cam 258 and also causing belts 264 to move to provide alignment of tubes delivered thereto from chute 244. Motor means 263 remains energized until switch arm 315 is again held in the down position by the tubes above it in tube magazine 275.

To assure that there will always be a constant supply of tubes available for delivery to the tube magazine 275, another switch means (not shown) is provided to cause the energization of the elevator drive mechanism 218 whenever the supply of tubes on chute 244 is depleted. To this end, the switch is suitably arranged to be held in its open position, operative to deenergize the drive mechanism 218, by tubes on the chute 244 adjacent the blades 254 of gate means 248. When these tubes have all been delivered to the top of belts 264, and thence to tube magazine 275, the switch moves to its closed position energizing the elevator drive mechanism until tubes delivered from the supply box 215 to the chute 244 cause the switch to be again held in its open position. For example, supply box 215 is supplied with a slidably mounted cover which is restrained from movement by extending portions of the frame and chute 244 which communicates with the front of the box so that when box 215 is raised by the elevator means tubes fall therefrom onto the chute 244.

Located just below the tube magazine 275 is a tube holding means having a movable jaw 318. The tube holding means is carried at the top of a tube transfer member, generally designated at 320, and is arranged to receive and hold the tube released from the bottom of tube magazine by the escapement means 290. The movable jaw 318 of the tube holding means is actuated between open and closed positions by the piston-rod 322 of a suitable air cylinder 323, the body of which is connected to a suitable bracket 324 tube transfer member 320.

Tube transfer member 320 is arranged to be actuated by and in response to the movement of C-frame member 94 so as to be moved from its horizontal position in front of the tube supply and transfer station 40, as illustrated in FIGURES 1 and 9, to a vertical position above the index table 85 of second work station 20, as shown in FIGURE 7.

To this end, a drive arm 326 is provided having one end pivotally connected at 328 to the tube transfer member 320 and the other end thereof suitably keyed to a drive shaft 330 for rotation therewith. Driveshaft 330 is journaled in suitable bearings 332. A gear 336 is connected to one end of driveshaft 330 and meshes with a drive gear 338. Drive gear 338 is keyed to a shaft 339 which is connected to one end of arm 340 the other end of which is pivotally connected at 342 to C-frame member 94. Shaft 339 is journaled at its ends in suitable bearings (not shown). Arm 340 is thus arranged to cause rotation of driveshaft 330 in response to vertical movement of C-frame member 94. As shown, rotation of driveshaft 330 causes tube transfer member 320 to be moved from its position in front of station 40 to its position above the index table 85 at second work station 20. The drive arms and gearing are arranged so that movement of C-frame member 94 from its maximum upward position, as shown in FIGURE 7, to its maximum downward position, as shown in FIGURE 1, is operative to cause the tube holding means of tube transfer member 320 to move from a vertical position above index table 85 at second work station 20 to a horizontal position in front of and below the tube magazine 275 at the tube supply and transfer station 40, and vice versa.

To assure that tube transfer member 320 will be properly oriented at its two different positions, that is, horizontal at one position and vertical at the other, there is provided a link 346 one end of which is pivotally connected at 348 to the tube transfer member 320 and the other end of which is pivotally connected at 350 to a vertical member 352.

A counterweight 354 may be suitably connected from the drive arm means to reduce the amount of power required to drive the C-frame member 94 and tube transfer member 320. The counterweight may be connected in any convenient manner and is illustrated schematically as being pivotally connected from an extending end of drive arm 326 in FIGURE 9 and from the end of a separate arm in FIGURE 1.

The apparatus also includes a number of separate switch means located at different points to assure that all tools are in their proper operating positions and that all such tools are withdrawn from their respective work pieces prior to allowing any indexing of the tables to take place. Conveniently, the switches may be arranged electrically in series circuit relationship so that the apparatus can not be rendered operative, or will shut down if in the operation, when any one of such switch means is in an open position. Except for a "first end" sensor switch 360 illustrated in FIGURE 6 the other switch means are not shown on the drawings but are physically located as follows:

(1 & 2) one switch means on each end of movable jaw 318 of the tube holding means on tube transfer member 320;
(3) one switch means on the bottom of the C-frame member 94, that is, the end illustrated as being in the pit in FIGURES 4 and 5;
(4) sensor switch 360 on first tool assembly and shown in FIGURE 6;
(5 & 6) one switch means on each of the drill heads 72 and 73;
(7) one switch on the third tool assembly 194.

OPERATION

Since the foregoing apparatus is arranged to drill or ream holes in stacks of plates at the first work station 10, install tubes and secure the first end thereof at second work station 20 and also secure the second end of such tubes at third work station 30, the proper work pieces must be mounted at such work stations prior to initiating the operation of the machine. Assume initially, therefore, that work station 10 has stacks of end and baffle plates suitably mounted to index table 60 and that drill heads 72 and 73 are each fitted with suitable drills. Assume also that there is mounted on index table 85 a suitable fixture into which the correct number of end and baffle plates are assembled and aligned; the holes in such plates having been drilled and reamed during a prior operating cycle at first work station 10 so that the holes therein are in the predetermined pattern provided by the tape controlled drill machine thereof. This fixture and the vertically stacked array of end and baffle plates is schematically illustrated in FIGURE 1.

Assume further that the work piece mounted at work station 30 is the partially completed tube assembly from a prior operating cycle obtained from second work station 20. Accordingly, the work piece mounted and aligned on the work supporting platform 196 has all the tubes installed in the holes in the plates thereof and the bottom end of all such tubes are secured into the associated end plate. All that remains to complete the tube assembly at work station 30, therefore, is to secure the top ends of the tubes into the tube sheet.

As illustrated in FIGURE 1 also, a tube supply box 215 is suitably secured in the elevator 206 with the cover facing the front of the tube supply and transfer station 40. As shown, the platform 208 of elevator 206 is in its lowered position. As described hereinbefore, the drive mechanism 218 is arranged to be energized periodically to assure a suitable buffer supply of tubes on the chute 244 behind the blades 254 of the gate means 248.

Figure 3:
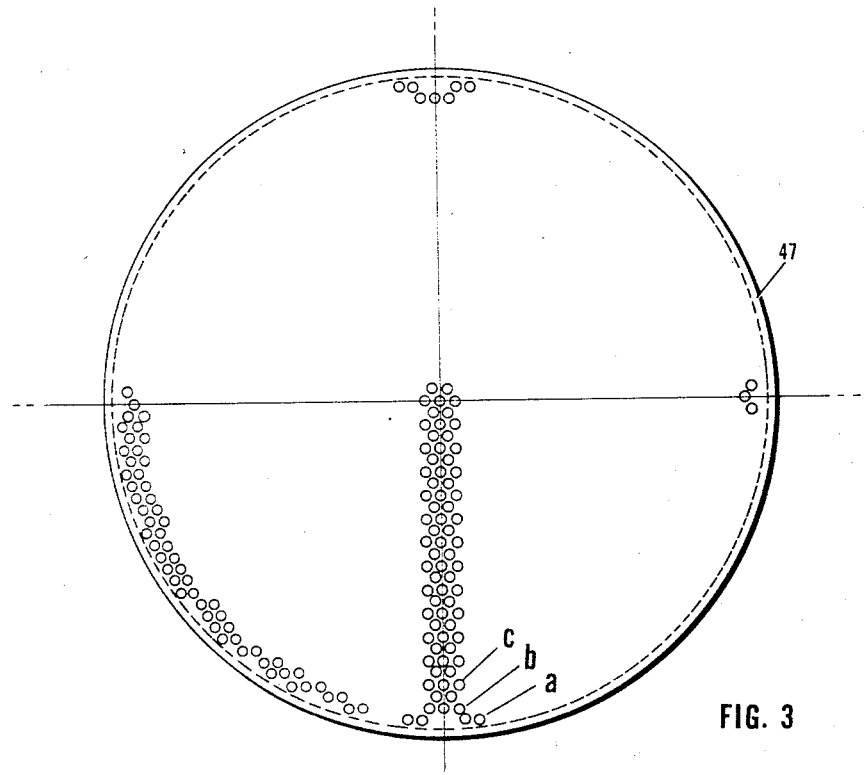
FIGURE 3 is a top view of an end plate of a tube assembly partially showing the arrangement of the holes to be provided therein.

Keeping the foregoing assumptions in mind the apparatus is initially set up so that holes will be drilled in the predetermined pattern such as partially illustrated, for example, in FIGURE 3. Conveniently, the tape program is arranged so that index table 60 is arranged with respect to the drills in drill heads 72 and 73 to begin drilling the holes from left to right then right to left etc. after suitable indexing in the Y direction to start each new row. It will be understood, however, that any other suitable program may be employed.

The first hole to be drilled, therefore, may be the hole on the left side of row A of the plates as illustrated in FIGURE 3. The table 60 is then sequentially indexed to the left, in the X-direction, to complete the drilling of all the holes in row A. When the last hole in row A has been drilled, table 60 is indexed in the Y-direction to the next row (row B) and table 60 indexed from left to right in the X-direction until all holes in row B have been drilled. The same indexing continues row after row until all of the holes have been drilled.

Each time table 60 at first work station 10 is moved to a new X–Y coordinate the index table 85 at work station 20 is similarly moved so that the same hole is at the same location with respect to the first and second tool assemblies 98 and 99 mounted on the C-frame member 94. Also, since the tool assembly 194 is integrally associated with index table 60 that tool at third work station 30 is also indexed with respect to the work piece mounted therein to the hole having the same X, Y coordinates.

The complete operation will now be described for the drilling cycle of operation following the completion of the reaming cycle. Accordingly, during the time that the reaming cycle was being run, end plates 47 and 48 and three baffle plates 50 had been properly assembled into a fixture to provide the next work piece for the second work station 20. Preferably, the plates are assembled into the fixture in the same position as they were previously drilled and reamed.

The tape in the tape control 78 is rewound to its starting position and index table 60 is manually returned to its rearward position. The roller expansion tool is removed from tool assembly 194 at the third work station and the work piece just completed at that station is removed.

The roller expansion tool 138 is removed from the first tool assembly 98 to allow the partially completed tube assembly and fixture to be lifted and removed from the index table 85 at the second work station 20. This partially completed, fixtured tube assembly is then inverted, that is, turned 180 degrees, and mounted and aligned on the work support platform 196 at the thrid work station 30. The fixture with plates previously assembled therein as described is lifted onto index table 85 at the second work station and suitably mounted and aligned thereon. The roller expansion tools are then re-installed in the first and third tool assemblies at the second and third work stations, respectively. New, undrilled stacks of plates are then mounted on index table 60 and suitably aligned thereon. The apparatus is now properly set up with the drills over the proper location on the stacks of plates 75, tool 138 over an empty hole at the same X, Y coordinate at second work station 20 and the tool at the third work station similarly positioned.

As the drilling operation begins power is applied to drive C-frame member 94 from its lower position toward its upper position. Also, air motor 182 of the second (lower) tool assembly 99 is energized causing holding and driving tool 185 to be rotated. Since C-frame member 94 is moving upward, the holding and driving tool 185 is caused to pass through the hole at that location in the stacked array of end and baffle plates until the tip 187 of holding and driving tool 185 extends from the bottom of such array through the hole in the top end plate thereof. The C-frame member is now at its maximum upper position and means are actuated thereby to prevent further rotation of air motor 182. That is, motor 182 is suitably blocked so that it functions conveniently as a holding means to prevent holding and driving tool 185 from rotating.

While the C-frame member 94 was moving to this maximum upper position the movement of arm 340 drivingly connected between C-frame member 94 and tube transfer member 320 through gears 338 and 336, driveshaft 330 and drive arm 326, is operative to cause the tube transfer member 320 to move from a position wherein the tube holding means thereof is positioned horizontally in front of and below the bottom of tube magazine 275 at the tube supply and transfer station 40 to a position wherein such tube holding means is positioned vertically above the work piece at the second work station 20. Since table 85 is indexed from and in the same manner as index table 60 the tube holding means is positioned at the location of the hole having the same X, Y coordinates as the hole being drilled at the first work station 10. Prior to the foregoing movement of tube transfer member 320, the escapement means 290 at the bottom of tube magazine 275 was caused to be actuated to allow a single tube to be released therefrom and fall into the tube holding means of the tube transfer member 320 after which air cylinder 323 is caused to be actuated to close movable jaw 218 to clamp the tube therein.

At this point, the C-frame member 94, tube transfer member 320 and first tool assembly 98 are in the positions substantially as illustrated in FIGURE 7. The air cylinder 110 of first tool assembly 98 and the air cylinder 178 of second tool assembly 99 are then actuated to cause the respective tool assemblies 98 and 99 to move toward each other for a short distance. For example, first tool assembly 98 moves downward for a distance of say about two inches while second tool assembly 99 moves upward about the same distance. This movement of the two tool assemblies is operative to move the tip 187 of holding and driving tool 185 into the lower end of the tube held by tube transfer member 320 and the tip or cage of roller expansion tool 138 to be moved into the upper end of such tube. Thus, the tube is caused to be held between the two tools mounted at the upper and lower extending arms 95 and 96 respectively of the C-frame member 94.

When the two tool assemblies are properly positioned as just described holding the vertically positioned tube, the air cylinder 323 on tube transfer member 320 is caused to be actuated to release the tube previously clamped therein. Also, air motor 182 of the second (lower) tool assembly 99 is again energized and, because of the action of holding tip 187 on tool 185, the tube held between the two tool assemblies is caused to be rotated thereby. The C-frame member is then caused to be driven from its upper position to its lower position to cause the rotating tube to be inserted from top-to-bottom in the hole in the stacked array of plates.

When the first tool assembly rests on the top of the end plate at the top of the stacked array of plates, indicating that the tube has been completely installed through the plates, the air motor 182 is again caused to be blocked to prevent its rotation and the air motor 132 of the first (upper) tool assembly is energized to cause the mandrel 134 of roller expansion tool 138 (now positioned within the top of the tube just installed) to be rotated. The air cylinder 118 of the first tool assembly is then actuated to cause the mandrel 134 of roller expansion tool 138 to be moved downward expanding the rollers and causing the end of the tube to be expanded in a manner well known in the art to properly secure the tube into the end plate. Since roller expansion tool 138 is preferably of the parallel expanding, tapered mandrel type, it is self-feeding and air cylinder 118 is only required to provide for the initial downward movement of the mandrel 134 after which the roller becomes self-feeding as is well known.

When the tube is expanded to such an extent that the torque required to continue to rotate mandrel 134 exceeds the torque limit of the clutch means 140, the clutch slips and, after being allowed to slip for a predetermined time, the air motor is reversed, and air cylinder 118 is actuated up, after which the air cylinder 110 is actuated to cause the roller expansion tool 138 to be withdrawn from the end of the tube.

During this time, the air cylinder of the third tool assembly is caused to be actuated to cause the roller expansion tool thereof to be inserted into the "second" end of the tube of the work piece thereof at the complementing X, Y location (since this work piece is rotated 180 degrees). When the expansion tool is properly positioned within the end of the tube the air motor of that tube assembly is energized to perform the roller expansion operation. Since the expansion tool at this work station is preferably of the progressive, retractable type, it is operative to roll the end of the tube from the bottom thereof toward the top. After the rolling operation is completed, the roller expansion tool at this station is also returned to its raised position by actuation of the air cylinder thereof.

With the tubes installed at the second work station and the first end thereof secured to its tube sheet, the holes drilled at the first work station and the "second" tube end secured to its tube sheet at the third work station, the apparatus is again ready to be indexed to a new X, Y coordinate and the foregoing sequence repeated until all holes have been drilled at the first work station 10 all tubes installed at second work station 20 and all tube ends secured into the respective tube sheets the second and third work stations.

It will be apparent to those skilled in the art that the illustrated embodiment of my invention is exemplary only and that many changes and modifications may be made without departing from the invention. It is intended, therefore, that the appended claims cover all such changes and modifications as fall within the true spirit and scope of the invention.

What I claim as new and desire to secure by Letters Patent of the United States is:

1. Apparatus for manufacturing tube assemblies for heat exchangers of the tube-and-shell type wherein the tube assembly includes a plurality of tubes secured at their ends in holes in end plates and wherein such tubes also pass through holes in a plurality of baffle plates arranged in spaced-apart relationship intermediate the end plates, the combination comprising:
 (a) a first work station including a table indexable to different X, Y coordinates, means disposed above said table for drilling or reaming holes in a stacked plurality of plates adapted to be mounted on said table and means for sequentially indexing said table to different X, Y coordinates to provide for the drilling or reaming of holes in a predetermined pattern;
 (b) a second work station including,
  (1) a second table indexable to different X, Y coordinates interconnected to said table at said first work station so as to be similarly indexed thereby, said table including means for mounting a fixture means having arranged therein a stacked array of vertically spaced-apart end plates and baffle plates each having holes therethrough in said predetermined pattern and in vertical alignment.
  (2) driving and holding means disposed on one side of said table adapted for rotating and inserting a tube positioned vertically above a hole in the plates of said fixture means having an X, Y location with respect to the driving and holding means corresponding to that at the first work station with respect to said drilling or reaming tool; and
  (3) roller expansion tool means disposed on the other side of said table arranged to be actuated after said tube has been in the plates of said fixture means for expanding that end of said tube into its end plate for securing it therein.

2. The apparatus of claim 1 wherein said first work station is provided by a tape-controlled drill machine.

3. The apparatus of claim 1 wherein the holes of said predetermined pattern are symmetrical about the center lines of said plates and further including a third work station having a tool supporting arm interconnected to the table of said first work station so that a roller expansion tool means mounted on said tool supporting arm is indexed thereby to similar X, Y coordinates with respect to a fixture means mounted therein and having tubes assembled therein but secured at only one end to the associated end plate.

4. The apparatus of claim 3 wherein said first work station is provided by a tape controlled drill machine.

5. The apparatus of claim 3 wherein the roller expansion tool means at said second work station is of the parallel expanding, self-feeding, tapered mandrel type and the roller expansion tool means at said third work station is of the progressive, retractable type.

6. Apparatus for manufacturing tube assemblies for heat exchangers of the tube-and-shell type, wherein the tube assembly includes a plurality of tubes secured at their ends in holes in end plates and wherein such tubes also pass through holes in a plurality of baffle plates arranged in spaced-apart relationship intermediate the end plates, the combination comprising:

(a) a first work station including a drill machine having a work supporting table adapted for movement in both the X and Y directions and including means for supporting a stacked assembly of plates to be operated upon to provide end plates and baffle plates of a tube assembly;

(b) a second work station arranged adjacent said first work station and having a work supporting table adapted for movement in both the X and Y directions and including means for supporting a vertically spaced-apart, stacked array of end plates and baffle plates each having a plurality of holes therethrough in the same predetermined pattern and with such plates and the holes thereof being in vertical alignment so that tubes may be passed therethrough to provide a tube assembly, said second work station further including:

(1) a vertically extending support structure, (2) a ram reciprocally positioned on said supporting structure and having a first arm extending from its upper end over and above said work supporting table and a second arm extending from its lower end over and below said work supporting table, (3) a first tool assembly mounted on said upper arm for limited vertical movement with respect thereto and including a roller expansion tool means having a mandrel, a motor means, a torque-limiting clutch means coupling the output shaft of said motor means to said mandrel, first positioning means for causing limited vertical movement of said first tool assembly and second positioning means for causing vertical movement of said mandrel;

(4) a second tool assembly mounted on said lower arm for limited vertical movement with respect thereto and including a motor means, a holding and driving tool means coupled to said motor means for rotation thereby and a positioning means operative to cause vertical movement of said tool assembly;

(c) means for interconnecting said first and second work station work supporting tables so that said tables are correspondingly indexed in the X and Y directions;

(d) means for causing the work supporting table at said first work station to be indexed sequentially to different X, Y coordinates and for operating said drill machine associated therewith to perform a selected drilling or reaming operation on said plates in a predetermined pattern;

(e) means responsive to the completion of the indexing of said table for causing movement of said ram;

(f) a tube supply and transfer station arranged adjacent said second work station and including, (1) a tube magazine having a discharge opening at the bottom thereof, (2) means associated with said tube magazine for releasing tubes one at a time from the discharge opening thereof, (3) means for maintaining a supply of horizontally aligned tubes in said tube magazine, and (4) a tube transfer member having a tube holding means carried thereby, said tube transfer member being arranged to be movable between a first position wherein said tube holding means thereof is positioned parallel with and below the discharge opening of said tube magazine adapted to receive a tube released therefrom and a second position wherein the tube holding means thereof is positioned in vertical alignment between the first and second tool assemblies carried by said ram;

(g) mechanical linkage means coupled to said ram and to said tube transfer member for causing said tube transfer member to be moved in a preselected relationship in response to and in coordination with the movement of said ram so that said tube transfer member moves between its first and second positions;

(h) means responsive to the arrival of said ram at a predetermined upper position for causing said first and second tool assemblies to be moved vertically a preselected distance toward each other, said vertical movement being adapted to provide for the positioning of the tool means of said tool assemblies within the respective ends of a tube held in a vertically aligned position therebetween by the tube holding means of said tube transfer member;

(i) means responsive to the completion of the vertical movement of said tool assemblies for actuating said tool holding means, actuation of said tool holding means being adapted to release the tube carried thereby from said tube magazine;

(j) means responsive to initiation of movement of said ram for energizing said motor means of said second tool assembly operative to rotate the holding and driving tool means thereof;

(k) means responsive to the arrival of said ram at a predetermined lower position for (1) blocking rotation of the motor means of said second tool assembly (2) energizing said motor means of said first tool assembly and (3) actuating the second positioning means of said first tool assembly for causing vertical movement of said mandrel; and (1) means responsive to the completion of the roller-expansion operation of said first tool assembly for reversing the direction of rotation of said motor means of said first tool assembly and actuating the first positioning means thereof to raise said first tool assembly.

7. The apparatus of claim 6 wherein said first work station is provided by a tape-controlled drill machine.

8. The apparatus of claim 6 wherein the holes of said predetermined pattern are symmetrical about the center lines of said plates and further including a third work station having a work supporting platform and a tool supporting arm arranged thereabove and interconnected to said table of said first work station; a roller expansion tool means mounted on said tool supporting arm so that said roller expansion tool means is indexed with respect to a hole of a fixture means adapted to be mounted therein and which has tubes assembled therein but secured at only one end to the associated end plate by the tool of said first work station.

9. The apparatus of claim 8 wherein the roller expansion tool of said first tool assembly of said second work station is of the parallel expanding, self-feeding, tapered mandrel type and the roller expansion tool of said third work station is of the progressive, retractable type.

10. In a heat exchange tube assembly manufacturing machine, the combination comprising:

(a) a vertically extending supporting structure;

(b) a ram reciprocally positioned on said supporting structure, said ram having a first arm extending from its upper end and a second arm similarly extending from its lower end;

(c) a table positioned intermediate said first and second extending arms, said table being adapted to be indexed in both the X and Y directions and including means for supporting a vertically spaced-apart, stacked array of tube sheets and baffle plates each having a plurality of holes therethrough in the same predetermined pattern and with the holes in said plates being in alignment;

(d) first and second tool assemblies mounted on the upper and lower arms respectively and each assembly being mounted thereon for limited vertical movement with respect to such arm, said first tool assembly including: a roller-expansion tool means having a mandrel, a motor means, a torque-limiting clutch means coupling said motor means to the mandrel of said roller-expansion tool means operative to cause rotation of the mandrel, first positioning means for causing limited vertical movement of the first tool assembly and second positioning means for causing vertical movement of said mandrel; said second tool assembly including a driving and holding tool means, a motor means coupled to said driving and holding tool means and means for causing limited vertical movement of said driving and holding tool means;

(e) mechanical linkage means operatively coupled to said ram and coordinated with the movement thereof for positioning a tube holding means from a first location adjacent a tube magazine to a second location in vertical alignment with said first and second tool assemblies and vice versa, said tube holding means including a movable jaw and means for actuating said jaw between open and closed positions;

(f) means actuated in response to the arrival of said ram at its upward position for causing said first and second tool assemblies to be moved vertically a preselected distance toward each other, said movement being adapted to position a tube from said tube holding means between the tool means of said first and second tool assemblies;

(g) means operative to actuate said movable jaw from its closed to its open position;

(h) means responsive to initiation of downward movement of said ram for energizing the motor means of said second tool assembly operative to cause rotation thereof and of a tube adapted to be held by the holding and driving tool thereof;

(i) means responsive to the arrival of said ram at its lower position for (1) blocking rotation of the second motor means to prevent rotation thereof, (2) energizing the motor means of said first tool means and (3) actuating the second positioning means of said first tool assembly for causing limited vertical movement of the mandrel of said roller-expansion tool means; and (j) means responsive to completion of the roller expansion operation for reversing the direction of rotation of the motor means of said first tool means and for causing energization of said first actuating means thereof for causing vertical movement of said first tool means.

11. Apparatus for horizontally aligning tubes comprising in combination:

(a) a supporting structure having a front and a rear section;

(b) first and second laterally spaced apart shafts journaled in said supporting structure;

(c) a plurality of pulleys arranged in horizontally spaced apart relationship on said first and second shafts;

(d) a like plurality of belts connected between the pulleys on said shafts, said shafts, belts and pulleys being so organized that the top surface of said belts is inclined upwardly from front to rear;

(e) means for causing one of said shafts to be rotated in a direction whereby said belts move up-hill;

(f) means for delivering randomly positioned tubes to the top surface of said belts; and (g) means arranged in front of said belts for receiving such tubes in horizontally aligned condition.

12. Apparatus for supplying horizontally aligned tubes from a gross supply source to a tube magazine comprising, in combination:

(a) a supporting structure having a front section and a gear section;

(b) means arranged in said rear section adapted to hold said gross supply of tubes;

(c) a forwardly inclined chute communicating at its rear with the means adapted to hold said gross supply of tubes and at its front with a gate means arranged and adapted to be selectively moved from a closed position operative to retain tubes on said chute to an open position operative to allow tubes to be released from the front of said chute;

(d) horizontal tube alignment means disposed in front of and below the front end of said chute, said means including horizontally spaced-apart vertical side wall means, a first horizontally disposed shaft journaled near the rear of said tube alignment means, a second horizontally disposed shaft journaled near the front thereof, a plurality of horizontally spaced-apart pulleys arranged on said first and second shafts respectively, and a like plurality of belts connected between the pulleys of said first and second shaft, said shaft, pulleys and belts being arranged so that the top surface of the belts is inclined upwardly from front to rear;

(e) a tube magazine arranged in front of and below the top of the belts passing over the pulleys arranged on said second shaft so that tubes rolling down the surface of said belts are delivered to said tube magazine;

(f) means responsive to the indication of a need for delivery of tubes to said magazine for causing said first shaft to be rotated in a direction whereby said belts run up-hill; and (g) means associated with said first shaft and responsive to the rotation thereof for causing said gate means to be operated to deliver tubes from said chute to the top of said belts whereby those tubes not in horizontal alignment are caused to be driven up-hill thereby and squared-off by action of said vertical side wall means after which such tubes roll forward on their own axes to be delivered to said magazine.

13. In an apparatus for manufacturing tube assemblies for heat exchangers of the tube-and-shell type a tube transfer and positioning mechanism comprising, in combination:

(a) a supporting structure;

(b) a tube magazine arranged parallel with the front of said supporting structure and having a discharge opening at the bottom thereof;

(c) means associated with said tube magazine for maintaining a supply of horizontally aligned tubes therein;

(d) escapement means mounted near the bottom of said tube magazine for releasing tubes one at a time from said discharge opening;

(e) a tube transfer member having a tube holding means carried thereby, said tube transfer member being arranged to be movable between a first position wherein said tube holding means thereof is positioned parallel with said tube magazine and at a location with respect thereto for receiving a tube discharged therefrom and a second position wherein said tube holding means is positioned at a location horizontally displaced from said tube magazine and in vertical orientation with respect to the front of said apparatus at said horizontally displaced location;
(f) a first link pivotally connected at one end to said tube transfer member and keyed at its other end to a driveshaft;
(g) a second link pivotally connected at one end to said tube transfer member and at its other end to a vertically extending member disposed intermediate the location of said tube magazine and said location horizontally displaced therefrom; and
(h) means for causing limited rotation of said drive operative to cause said tube transfer member to be moved between said first and second positions the direction of movement being determined by the direction of rotation of said driveshaft.

14. A method of making a tube assembly of the tube-and-shell type comprising:
(a) providing a plurality of plates sufficient in number and configuration to provide the end plates and baffle plates of a tube assembly;
(b) forming holes in said plates of a preselected size and in a predetermined pattern;
(c) assembling said plates with the holes formed therein in a fixture means so that said plates are arranged in vertically spaced-apart relationship and with said holes in vertical alignment;
(d) placing said fixture means with said plates assembled therein on a table indexable in both the X and Y directions disposed between upper and lower vertically aligned tool means;
(e) positioning a tube in vertical alignment over a hole in the plates in said fixture means at a given X, Y location;
(f) fitting the tip of an unexpanded roller expansion tool associated with the upper tool means into the upper end of said vertically positioned tube;
(g) rotating and inserting a holding and driving tool associated with the lower tool means from bottom-to-top through a hole at a given X, Y location on the plates in said fixture means;
(h) stopping rotation of the holding and driving tool after its insertion through the hole in the plates of said fixture means and moving said tool vertically upward a distance sufficient to position the driving and holding tip thereof into driving engagement within the lower end of said vertically positioned tube;
(i) rotating said holding and driving tool while simultaneously moving in unison both the roller-expansion tool at the upper end of said tube and the holding and driving tool at the lower end thereof from top-to-bottom to cause the tube held between said two tools to be rotated, guided and inserted through the hole at said given location in the plates of said fixture means; and
(j) stopping and preventing further rotation of the holding and driving tool after movement thereof downwardly a preselected distance sufficient to locate the end of the tubes approximately flush with the end surfaces of the end plates at opposite ends of said fixture means;
(k) rotating and causing expansion of said roller expansion tool to secure the upper end of said tube into its end plate;
(l) moving said roller expansion tool and said holding and driving tool vertically away from each other to withdraw the tips thereof from the opposite ends of the tube in the plates of said fixture means;
(m) removing said fixture means from said table, turning it 180° and aligning it on a work supporting platform with respect to a roller-expansion tool disposed thereabove;
(n) positioning the roller-expansion tool into the end of a tube in said fixture means; and
(o) roller expanding the end of said tube to secure same into its end plate.

15. A method of making a tube assembly for heat exchange devices which comprise the steps of:
(a) providing at least two plates each having a plurality of holes therethrough arranged in the same predetermined pattern;
(b) providing spaced-apart first and second tool means in alignment with each other and arranged for common reciprocating movement;
(c) locating and securing the plates in spaced-apart relationship so that the holes thereof are all in alignment and with a given hole location in alignment with said first and second spaced-apart, aligned tool means so that the common movement thereof causes one tool means to move in one direction with respect to said plates and the other tool means to move in the opposite direction with respect to such plates;
(d) moving said first and second tool means in a first direction to cause a guide rod operably associated with one of said tool means to be inserted from end to end through the aligned holes in said plates at said given location;
(e) locating and securing a tube of a predetermined length determined by the spaced-apart plates between the end of the guide rod emerging from said hole and the other tool means in alignment therewith;
(f) causing movement of said first and second tool means in a direction opposite said first direction so that said guide rod is withdrawn from the holes at said given location and said tube caused to be inserted therein; and
(g) securing at least one of the ends of said tubes into the corresponding plates associated with such ends.

16. The method of claim 15 including the step of roller expanding the ends of said tubes to secure said ends into the plates associated with such ends.

17. The method of claim 15 including the steps of:
(a) roller expanding one end of said tubes in a parallel manner so that expansion of the inside diameter of the tube end takes place over the entire end region being expanded at the same time; and,
(b) roller expanding the other end of said tubes in a progressive manner so that expansion of the inside diameter of the tube end takes place progressively beginning at a location remote from the terminus of said other end and progressing outwardly toward such end.

18. The method of claim 15 including the steps of:
(a) rotating said guide rod during movement of said first and second tool means in both said first and opposite directions.

19. The method of claim 15 including the steps of:
(a) holding one end of said tube after the insertion thereof to prevent its rotation; and
(b) roller-expanding the opposite end of said tube to secure same into the plate with which such opposite end is associated.

20. Apparatus for making tube assemblies for heat exchange devices of the type wherein a plurality of tubes are arranged in a predetermined pattern and wherein such tubes are secured at their ends in holes provided therefor in spaced-apart end plates, the combination comprising:
(a) a ram arranged for reciprocal movement with respect to a work supporting means, said ram having a first arm extending from one end thereof and a second arm extending from the other end thereof so that a work piece on said work supporting means lies between said arms;
(b) first and second tool means;
(c) means mounting said first tool means on the extending arm at one end of said ram and said second tool means on the extending arm at said other end of said ram so that the operating portions of said first and second tool means are in alignment, at least one of said tool means being arranged for selective individual movement toward and away from the other tool means;

(d) a guide rod operably associated with one of said tool means, said guide rod having a diameter and length such that when said ram is in one extreme position the end of said guide rod is free of a work piece disposed on said work supporting means and when said ram is in the other extreme position, said guide rod is adapted to have been passed from end-to-end through an aligned opening of said work piece;

(e) means for imparting reciprocal movement to said ram; and (f) index means associated with said work supporting means or said tool means so that said tool means are adapted to be selectively aligned with different aligned openings of said work piece.

21. The apparatus of claim 20 wherein at least the tool means with which said guide rod is operably associated has a motor means associated therewith arranged to cause rotation of said guide rod.

22. The apparatus of claim 20 wherein each of said first and second tool means has motor means associated therewith.

23. The apparatus of claim 22 including a roller expansion tool having a mandrel operably associated with the other of said tool means and having one of said motor means arranged to cause rotation of said mandrel and the other motor means arranged to cause rotation of said guide rod.

24. The apparatus of claim 22 wherein the other of said tool means includes a roller expansion tool having a mandrel and a torque limiting clutch means drivingly coupling one of said motor means to said mandrel to cause rotation of said mandrel.

25. The apparatus of claim 20 wherein said motor means associated with said guide rod is operative to cause rotation of said guide during the reciprocal travel of said ram.

26. The apparatus of claim 24 wherein said motor means associated with said guide rod is operative to cause rotation of said guide during reciprocal travel of said ram and to be prevented from rotating when said ram is at either of its extreme positions; and means for causing the motor means associated with the tool means to cause rotation of the mandrel of said roller expansion tool at a preselected one of the extreme positions of said ram.

References Cited

UNITED STATES PATENTS

| | | | |
|---|---|---|---|
| 1,024,124 | 4/1912 | Dietz | 29—202 |
| 1,025,897 | 7/1912 | Beebe | 29—202 |
| 1,339,434 | 5/1920 | Coffelder | 113—10 |
| 1,802,929 | 4/1931 | Seelert | 29—202 |
| 2,475,162 | 7/1949 | Thompson | 113—10 |
| 3,089,226 | 5/1963 | Szots et al. | 29—153 |
| 3,095,638 | 7/1963 | Seien | 29—202 |

JOHN F. CAMPBELL, *Primary Examiner.*

PAUL M. COHEN, *Assistant Examiner.*

U.S. Cl. X.R.

24—202; 113—1